United States Patent
Siddiqui

(10) Patent No.: US 11,511,258 B2
(45) Date of Patent: Nov. 29, 2022

(54) USING POROUS ACTIVATED ASPHALTENES AS EFFECTIVE ADSORBENTS FOR THE REMOVAL OF HEAVY METALS IN WATER

(71) Applicant: King Fahd University of Petroleum and Minerals, Dhahran (SA)

(72) Inventor: Mohammad Nahid Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 320 days.

(21) Appl. No.: 15/945,302

(22) Filed: Apr. 4, 2018

(65) Prior Publication Data

US 2019/0308165 A1 Oct. 10, 2019

(51) Int. Cl.
*B01J 20/18* (2006.01)
*B01J 20/02* (2006.01)
*B01J 20/04* (2006.01)
*B01J 20/28* (2006.01)
*B01J 20/30* (2006.01)
(Continued)

(52) U.S. Cl.
CPC ......... *B01J 20/186* (2013.01); *B01J 20/0259* (2013.01); *B01J 20/0262* (2013.01); *B01J 20/041* (2013.01); *B01J 20/28004* (2013.01); *B01J 20/28061* (2013.01); *B01J 20/28064* (2013.01); *B01J 20/28066* (2013.01); *B01J 20/28071* (2013.01); *B01J 20/28073* (2013.01); *B01J 20/3028* (2013.01); *B01J 20/3071* (2013.01); *B01J 20/3078* (2013.01); *B01J 20/3416* (2013.01); *C02F 1/281* (2013.01); *B01J 2220/42* (2013.01); *C02F 2101/206* (2013.01); *C02F 2101/22* (2013.01); *C02F 2101/308* (2013.01)

(58) Field of Classification Search
CPC .... B01J 20/186; B01J 20/0259; B01J 20/041; B01J 20/28004; B01J 20/28061; B01J 20/28064; B01J 20/28066; B01J 20/28071; B01J 20/28073; B01J 20/3028; B01J 20/3071; B01J 20/3078; B01J 20/3416; B01J 20/0262; B01J 2220/42; C02F 1/281; C02F 2101/206
See application file for complete search history.

(56) References Cited

U.S. PATENT DOCUMENTS 4,802,920 A 2/1989 Kukes et al.
9,120,978 B2 9/2015 Mazyar et al.
(Continued)

FOREIGN PATENT DOCUMENTS

WO 2016/154710 10/2016

OTHER PUBLICATIONS

Mohammad Nahid Siddiqui, Developing an effective adsorbent from asphaltene for the efficient removal of dyes in agueous solution, Dec. 16, 2016, p. 371-380.

*Primary Examiner* — Vishal V Vasisth
(74) *Attorney, Agent, or Firm* — Oblon, McClelland, Maier & Neustadt, L.L.P.

(57) ABSTRACT

A porous activated asphaltene material is described with a method of making and a method of using for the adsorption of a contaminant from a solution. The porous activated asphaltene material may be made by functionalizing solid asphaltene with nitric acid, and then treating the product with a metal hydroxide. The resulting porous activated asphaltene material exhibits a high porosity, and may be cleaned and reused for adsorbing contaminants.

12 Claims, 4 Drawing Sheets

(51) Int. Cl.
*B01J 20/34* (2006.01)
*C02F 1/28* (2006.01)
C02F 101/30 (2006.01)
C02F 101/20 (2006.01)
C02F 101/22 (2006.01)

(56) References Cited

U.S. PATENT DOCUMENTS

| | | |
|---|---|---|
| 9,212,159 B1 | 12/2015 | Siddiqui |
| 2016/0039678 A1 | 2/2016 | Tanimola |
| 2016/0075567 A1 | 3/2016 | Tour et al. |

USING POROUS ACTIVATED ASPHALTENES AS EFFECTIVE ADSORBENTS FOR THE REMOVAL OF HEAVY METALS IN WATER

STATEMENT OF ACKNOWLEDGEMENT

The author would like to acknowledge the support provided by the Deanship of Scientific Research (DSR) at King Fahd University of Petroleum & Minerals (KFUPM), Dhahran, Saudi Arabia, for funding this work.

BACKGROUND OF THE INVENTION

Technical Field

The present invention relates to a porous activated asphaltene material that may be used to adsorb contaminants from an aqueous solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crude oil consumption has increased dramatically recently, and while most of what is extracted may be processed into useful products, a significant fraction of the crude oil extracted comprises less desirable byproducts [Speight, J. G. *Fuel Science and Technology Handbook*, Marcel Dekkar (1990)—incorporated herein by reference in its entirety].

Of these byproducts, asphaltenes are considered among the least desirable. In the refining and cracking of petroleum, the precipitation of asphaltenes may reduce the flow of the oil, which may lead to blockage problems in the refining equipment [Cimino, R et al. *Asphaltenes Fundamentals and Applications*, Plenum Press (1995) 97—incorporated herein by reference in its entirety]. Also, asphaltenes may form sledges that may deactivate hydrodesulphurization and hydrocracking catalysts, leading to lower conversion efficiencies for the respective processes [Bartholomew, C. H. *Catalytic Hydroprocessing of Petroleum and Distillates*, Marcel Decker 4 (1994) 42 and Miyauchi, Y. et al. "Hydroprocessing." *Proceedings of the Akzo Nobel Catalysts Symposium* Amsterdam, The Netherlands (1994) 123-140—each incorporated herein by reference in its entirety].

While the structures of asphaltenes are generally difficult to study due to their complicated and varied compositions, it was reported that asphaltenes are composed of polyaromatic groups in the centre which may be connected with alicyclic groups, aliphatic groups, heteroatoms, and metals [Hasan, M. et al. *Fuel*, 67 (1988) 1131 and Shirokoff, J. W. et al. *Energy & Fuels*, 11 (1997) 561—each incorporated herein by reference in its entirety].

The contamination of water by heavy metals is a very serious problem for personal health and the environment, and these metals may be emitted from different sources, such as industrial waste streams.

The existence of even trace amounts of these heavy metals may cause many serious diseases like anemia, cancers, renal and kidney failure, and other serious diseases [Nordberg, G. F. et al. *Handbook on the Toxicology of Metals*, Academic Press (2007) 3rd edition—incorporated herein by reference in its entirety].

The main challenge of heavy metal contamination is their non-biodegradable nature. Since they do not decompose, heavy metals must be removed by suitable methods, such as precipitation, flocculation, and adsorption methods. Adsorption methods are generally preferred due to their simplicity, low cost, and availability.

Many types of sorbents have been studied for the removal of these heavy metals, such as activated carbon [Rao, M. M. et al. *Journal of Hazardous Materials* 129 (2006) 123-129 and Sekar, M. et al. *Journal of Colloid and Interface Science* 279 (2004) 307-313—each incorporated herein by reference in its entirety], fly ash [Ayala, J. et al. *Fuel* 77 (1998) 1147-1154—incorporated herein by reference in its entirety], peat [Ho, Y. S. et al. *Water Research* 33 (1999) 578-584—incorporated herein by reference in its entirety], recycled alum sludge [Chu, W. *Water Research* 33 (1999) 3019-3025—incorporated herein by reference in its entirety], peanut hulls [Brown, P. et al. *Advances in Environmental Research* 4 (2000) 19-29—incorporated herein by reference in its entirety], resins [Diniz, C. V. et al. *Separation Science and Technology* 37 (2002) 3169-3185—incorporated herein by reference in its entirety], kaolinite [Arias, M. *Chemosphere* 48 (2002) 1081-1088—incorporated herein by reference in its entirety], manganese oxides [Sublet, R. et al. *Water Research* 37 (2003) 4904-4912—incorporated herein by reference in its entirety], zeolite [Biskup, B. et al. *Separation Science and Technology* 39 (2004) 925-940—incorporated herein by reference in its entirety], biomaterials [Li, Q. et al. *Separation and Purification Technology* 34 (2004) 135-142 and Ekmekyapar, F. et al. *Journal of Hazardous Materials* 137 (2006) 293-298—each incorporated herein by reference in its entirety], carbon nanomaterial [Coughlin, R. et al. *Environ Sci Technol* 2 (1968) 291-297—incorporated herein by reference in its entirety], and multi-walled carbon nanomaterial [Rao, G. P. et al. *Separation and Purification Technology* 58 (2007) 224-231 and Yang, K. et al. *Chem Rev* 110 (2010) 5989—each incorporated herein by reference in its entirety].

In view of the foregoing, one objective of the present invention is to provide a porous activated asphaltene material for the adsorption of heavy metal contaminants from water. Asphaltene may be easily and cheaply obtained as an unwanted petroleum byproduct, and may be chemically modified to produce a highly porous compound with a high adsorption capacity. The asphaltene material may be reused by cleaning with a dilute acid.

BRIEF SUMMARY OF THE INVENTION

According to a first aspect, the present disclosure relates to a porous activated asphaltene material, comprising an asphaltene compound having an elemental composition of 55-77 wt % C, 10-40 wt % O, 1-3 wt % S, 0.6-1.7 wt % H, and 0.2-1.2 wt % N, each relative to a total weight of the asphaltene compound. The asphaltene compound has at least one active group selected from the group consisting of an amine group, a nitro group, a carbonyl group, a carboxylic group, a sulfoxide group, and a hydroxyl group, where the at least one active group is covalently bonded to an asphaltene core.

In one embodiment, the porous activated asphaltene material has an average particle size of 1-20 μm.

In one embodiment, the porous activated asphaltene material has a particle size distribution of 0.5-100 μm, wherein at least 60% of the particles have a particle size of 1-20 μm.

In one embodiment, the porous activated asphaltene material has a BET specific surface area of 200-4,800 m$^2$/g.

In one embodiment, the porous activated asphaltene material has a BET specific surface area of 1,000-4,800 m$^2$/g.

In one embodiment, the porous activated asphaltene material has an average pore size of 1-10 nm.

In one embodiment, the porous activated asphaltene material has a pore volume of 0.1-0.7 cm$^3$/g.

According to a second aspect, the present disclosure relates to a method for producing the porous activated asphaltene material of the first aspect. This method involves the steps of refluxing a solid asphaltene in nitric acid for 1-8 hours to produce a refluxed mixture; washing and drying the refluxed mixture to produce a functionalized asphaltene solid; grinding the functionalized asphaltene solid with a metal hydroxide to produce a ground mixture; heating the ground mixture at 300-1000° C. for 10-60 minutes to produce an activated powder; and then washing and drying the activated powder to produce the porous activated asphaltene material.

In one embodiment, a mass ratio of the functionalized asphaltene solid to the metal hydroxide is 1:1-1:8.

In one embodiment, the metal hydroxide is KOH.

In one embodiment, during the heating, the ground mixture is maintained in an atmosphere consisting essentially of $N_2$.

According to a third aspect, the present disclosure relates to a method of reducing a contaminant concentration in a solution. This method involves the step of mixing the porous activated asphaltene material of the first aspect with the solution comprising the contaminant at a contaminant concentration of 5 mg/L-2 g/L, so that a concentration of the porous activated asphaltene material in the solution after mixing is 0.5-15 g/L. The porous activated asphaltene material reduces the contaminant concentration in the solution by adsorption.

In one embodiment, the contaminant is at least one selected from the group consisting of Pb, Cr, Cd, Se, Hg, As, Mn, Ni, Cu, Zn, Ag, Tl, and Sb.

In one embodiment, the contaminant is a dye.

In one embodiment, the porous activated asphaltene material has an adsorption capacity of 15-950 mg of the contaminant per g of the porous activated asphaltene material.

In one embodiment, at least 70 wt % of the contaminant is adsorbed by the porous activated asphaltene material in at least 120 minutes.

In one embodiment, at least 90 wt % of the contaminant is adsorbed by the porous activated asphaltene material in at least 250 minutes.

In one embodiment, the aqueous solution has a pH of 2.5-8.0.

In a further embodiment, the method includes the steps of removing the porous activated asphaltene material from the aqueous solution to produce a recovered asphaltene material; mixing the recovered asphaltene material with an acidic solution; drying the acidic solution to produce a cleaned asphaltene material; and reusing the cleaned asphaltene material. The cleaned asphaltene material maintains an adsorption capacity for at least 5 purification cycles.

In a further embodiment, the acidic solution comprises one or more inorganic acids at a total concentration of 0.05-0.5 M.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
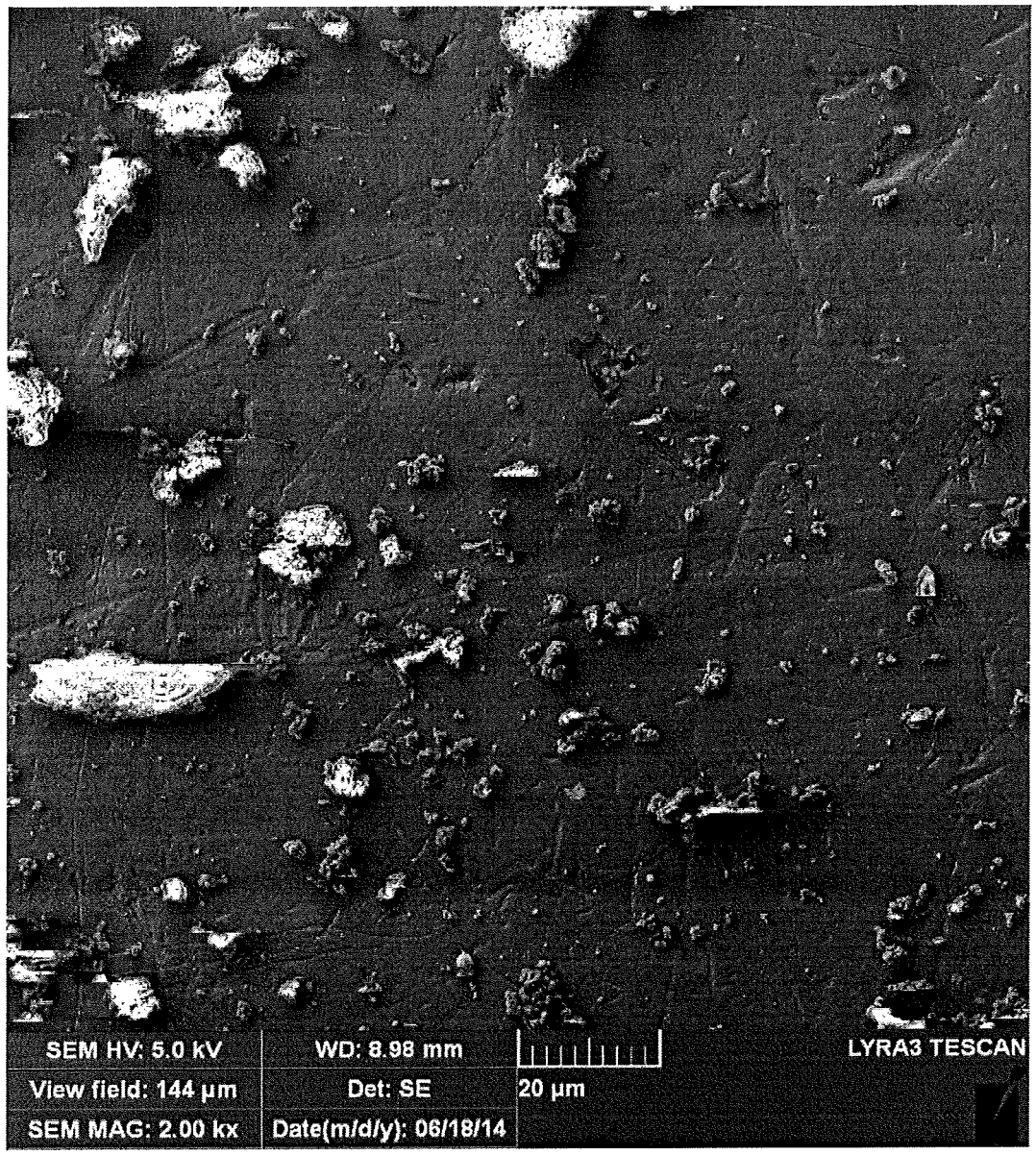
FIG. 1 is a scanning electron microscopy (SEM) image of an unmodified asphaltene material, with a scale bar of 20 μm.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

In addition, the present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}$C and $^{14}$C. Isotopes of nitrogen include $^{14}$N and $^{15}$N. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the terms "activation," "functionalization," or "surface functionalization" refer to a chemical process that introduces chemical functional groups to a surface of a material, which in the case of the present disclosure is asphaltene. As used herein, the term "functional group" is considered synonymous with "active group."

As used herein, "particle size" and "pore size" may be thought of as the diameters or longest dimensions of a particle and of a pore opening, respectively.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a porous activated asphaltene material. As used herein, "activated asphaltene" refers to the product of a chemical process that introduces chemical functional groups or active groups to a surface of asphaltene. For example, the functional group, or active group, may be an amine group, a nitro group, a carbonyl group, a carboxylic group, a sulfoxide group, or a hydroxyl group.

On the molecular level, asphaltenes are composed of various chemical species. Asphaltenes have a low hydrogen to carbon (H/C) ratio, and are believed to possess several long paraffinic side chains as opposed to many shorter paraffinic side chains or naphthenic groups. Subsequently, they are known to be polar and insoluble in a paraffinic solvent such as n-pentane or n-heptane. Furthermore, asphaltenes cannot crystallize and cannot be separated individually. The condensed structural units of asphaltenes bear alicyclic sites substituted and connected to aliphatic chains, with or without heteroatoms.

Asphaltenes contain a core of polycyclic aromatic hydrocarbons, which composition and size varies depending on the source of crude oil. Several hundred polycyclic aromatic hydrocarbons have been identified in petroleum substances, such as asphalt. Also known as polyaromatic hydrocarbons, these organic compounds are composed of multiple aromatic rings in which the electrons are delocalized. Although poly signifies 'many', there is precedence in the nomenclature to refer to two-ring cases as biphenyl and naphthalene, while anthracene and phenanthrene are examples of three-ringed structures.

The asphaltenes found in crude oils include several specific polyaromatic rings and aromatic heteroatom-substituted groups, including, but not limited to, benzoanthracene, such as 1H-benzo[de]anthracene; dibenzothiophene, such as 2-methyldibenzo[b,d]thiophene; (cyclopentylmethyl) (2,3,4,5,6-pentamethylphenyl) sulfane, benzo[b]naphtho[1,2-d]thiophene, and 1,2,4,5,7-pentamethyl-8-propyl-1,2,3,4-tetrahydronaphthalene.

Benzoanthracenes ($C_{12}H_{18}$) are a series of compounds containing four fused benzene rings. Benzoanthracenes contain an anthracene core fused to a further benzene group. Benzoanthracenes may be substituted or un-substituted with one or more alkyl, aryl or heteroatom-containing hydrocarbon groups such as hydroxyl, acyl, alkoxy, and related sulfur compounds. They are members of the polycyclic aromatic hydrocarbon (PAH) family. 3,4-Benz[a]anthracene and 1H-benzo[de]anthracene are members of the benzoanthracene series, and furthermore, a four-ringed member of the series of acenes.

Dibenzothiophenes are organosulfur compounds containing two benzene rings fused to a central thiophene ring. Also known as a tricyclic heterocycle, it is commonly seen as a component of heavier fractions of petroleum. A methyl-substituted dibenzothiophene, known as 2-methyldibenzo[b,d]thiophene, may be present in the asphaltene structure of the Saudi crude oils. Benzothiophenes may alternately be substituted with one or more other $C_1$-$C_{24}$ alkyl or aryl groups including ethyl, ethyl, propyl, butyl, pentyl, and hexyl.

One or more aryl sulfane groups containing at least one aryl group and preferably an aryl group and an aliphatic or alicyclic group may also be present as a substituent of an asphaltene. For example, cyclopentylmethyl 2,3,4,5,6-pentamethylphenyl sulfane is a sulfur containing moiety that may be positioned on the periphery of the polycyclic core of an asphaltene. The sulfur atom may also be considered a reactive site.

Additional chemical groups, such as 1,2,4,5,7-pentamethyl-8-propyl-1,2,3,4-tetrahydronaphthalene may also be present as part of the polycyclic core structure of asphaltenes obtained from Saudi crude oil, and may furthermore, be reactive in nitration, as well as alkylation and arylation reactions. This compound is an aromatic bicyclic hydrocarbon of the series of acenes.

The asphaltene used to make the porous activated asphaltene material of the present disclosure may be derived from Arab heavy crude, which preferably has an American Petroleum Institute (API) gravity of 25.0-30.0. Eq. (1) shows a formula to calculate API gravity is from a known specific gravity value (SG) of a hydrocarbon:

$$\text{API gravity} = \frac{141.5}{SG} - 131.5. \qquad \text{Eq. (1)}$$

In one embodiment, the asphaltene may come from a petroleum refining process as a byproduct. In other embodiments, the asphaltene may come from a process with the main objective of producing asphaltene. For example, asphaltene may be produced by heating and mixing a heavy residue crude oil with n-heptane. Leaving the mixture to gradually cool allows asphaltenes to precipitate, which may be removed by filtration, washed with more n-heptane, and then dried in an oven.

In one embodiment, the porous activated asphaltene material of the first aspect comprises an asphaltene compound having an elemental composition of 55-77 wt % C, preferably 60-70 wt % C, more preferably 64-69 wt % C, or about 67 wt % C; 10-40 wt % O, preferably 15-35 wt % O, more preferably 25-32 wt % O, or about 29 wt % O; 1-3 wt % S, preferably 1.2-2.7 wt % S, more preferably 1.6-2.3 wt % S, or about 2.0 wt % S; 0.6-1.7 wt % H, preferably 0.8-1.5 wt % H, more preferably 1.0-1.2 wt % H, or about 1.1 wt % H; and 0.2-1.2 wt % N, preferably 0.4-1.0 wt % N, more preferably 0.5-0.9 wt % N, or about 0.7 wt % N, each relative to a total weight of the asphaltene compound. In one embodiment, the asphaltene compound may comprise an elemental composition of about 67 wt % C, about 29 wt % O, about 1.9 wt % S, about 1.2 wt % H, and about 0.7 wt % N, each relative to a total weight of the asphaltene compound. In an alternative embodiment, the asphaltene compound may comprise an elemental composition of 80-84 wt % C, 14-8 wt % N, and 0.1-2.0 wt % S, each relative to a total weight of the asphaltene compound. The elemental composition may be determined by EDX, AAS spectrophotometer, or by some other method. Preferably the porous activated asphaltene material has the same overall elemental composition as the asphaltene compound. In one embodiment, the porous activated asphaltene material comprises one or more asphaltene compounds having different chemical structures and/or elemental compositions.

In one embodiment, the asphaltene compound has at least one active group selected from the group consisting of an amine group, a nitro group, a carbonyl group, a carboxylic group, a sulfoxide group, and a hydroxyl group, where the at least one active group is covalently bonded to an asphaltene core. The core may comprise polycyclic aromatic hydrocarbons, as described previously for asphaltenes. Preferably the at least one active group is a nitro group, a carboxylic group, or both. However in other embodiments, the asphaltene compound may have no active group, or may have a different active group than those listed.

The asphaltene compound may comprise fused polyaromatic rings forming a polycyclic core which further includes heteroatoms such as sulfur, oxygen, and nitrogen. These heteroatoms may be part of the aromatic ring system or part of other carbocyclic rings, linking groups, or functional groups. In the structural motif known as the continental structure, alkyl chains connect to and branch from a central polyaromatic ring system. In an alternative archipelago structural motif, multiple polyaromatic ring systems are connected by alkyl chains that may contain a heteroatom, and additional alkyl chains extend freely from the polyaromatic rings. The number of fused aromatic rings in the continental structure may be greater than the number of fused aromatic rings in the archipelago structure. The asphaltene compound may have a similar molecular structure as that described previously for asphaltene (i.e. unmodified asphaltene), but with the addition of one or more active groups as described previously.

In one embodiment, the asphaltene compound may comprise 60-99.5 mol %, preferably 65-95 mol %, more preferably 70-90 mol %, even more preferably 75-85 mol % aliphatic hydrocarbons relative to a total number of hydrocarbons. In a related embodiment, the asphaltene compound may comprise 0.5-40 mol %, preferably 5-35 mol %, more preferably 10-30 mol %, even more preferably 15-25 mol % aromatic hydrocarbons relative to a total number of hydrocarbons.

In addition to the aromatic regions of the asphaltene compound, heteroatoms provide the polar regions, and the terminal alkyl chains provide hydrophobic regions. As a result of these polar and non-polar regions, the asphaltene compound, as single molecules or as particles, may aggregate into various micellular structures in different solvents, or may form stacked structures having aligned aromatic regions and aligned aliphatic regions. In one embodiment, where the porous activated asphaltene material and/or the asphaltene compound forms micellular structures, the micellular structures may have a diameter of 5-100 μm, preferably 10-70 μm, more preferably 15-65 μm. In a further embodiment, the micellar structures may cluster together as agglomerates.

As used herein, a "polycyclic core" refers to a part of a molecule comprising at least two hydrocarbon ring structures either fused together or linked via a single or double bond. "Fused" means that the hydrocarbon ring structures have at least one bond in common. As used herein, the ring may be a 5- or 6-membered carbon-based structure. Hence, all of the ringed structures of a polycyclic core do not need to comprise the same number of atoms. Although the majority of atoms forming the rings are carbon, other atoms may be chosen from the group consisting of N, O, and S. Additionally, in most cases, all of the atoms forming the ring may be carbon. Each of the rings of the polycyclic core may bear one or more substituents. Non-limiting examples of such substituents include alkyl and aryl compounds.

Aliphatic compounds are organic compounds in which carbon atoms are joined together in a straight or branched chain or in rings. These compounds may be either saturated or unsaturated, but not aromatic. Therefore, aliphatic is a non-aromatic moiety.

In one embodiment, the presence, absence, or type of active group on the asphaltene core may change during the process of synthesizing the porous activated asphaltene material, using the porous activated asphaltene material to adsorb contaminants from a solution, or when cleaning the porous activated asphaltene material for reuse.

In one embodiment, the porous activated asphaltene material has an average particle size of 1-20 μm, preferably 2-10 μm, more preferably 3-6 μm. However, in some embodiments, the average particle size may be smaller than 1 μm or greater than 20 μm. In one embodiment, the porous activated asphaltene material has a particle size distribution of 0.5-100 μm, wherein at least 60%, preferably at least 70%, more preferably at least 75% of the particles have a particle size of 1-20 μm. However, in another embodiment, the porous activated asphaltene material may have a particle size distribution that is more varied, for instance, the particle sizes may range from 0.2-120 μm, with 40-60% or 50-60% of the particles having a particle size with the range of 1-20 μm. In another embodiment, a narrow particle size distribution may be obtained by selecting the particles for certain sizes, for instance, by filtering or centrifugation. In one embodiment, the porous activated asphaltene material may be considered to have one or more shapes similar to spheres, spheroids, ellipsoids, ovoids, flakes, grains, clumps, chips, raisins, or other irregular shapes with curved and/or flat surfaces. In one embodiment, particles of porous activated asphaltene material may have a length to width ratio of 1:1-6:1, preferably 1.2:1-5:1, more preferably 1.4:1-4:1. The porous activated asphaltene material may have a bulk density of 1.05-1.40 g/cm$^3$, preferably 1.10-1.30 g/cm$^3$, more preferably 1.15-1.25 g/cm$^3$, or about 1.2 g/cm$^3$.

In one embodiment, the particles of porous activated asphaltene material may be present as agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be particles of porous activated asphaltene material having a mean diameter as the particle sizes previously described.

In one embodiment, the porous activated asphaltene material has a BET specific surface area of 200-4,800 m$^2$/g, preferably 2,000-4,700 m$^2$/g, more preferably 3,000-4,650 m$^2$/g, even more preferably 3,600-4,600 m$^2$/g. Here, the surface area may be determined by Brunauer-Emmett-Teller (BET) analysis of N$_2$ adsorption isotherms, though other techniques may be used, such as mercury intrusion porosimetry. In one embodiment, the porous activated asphaltene material has a BET specific surface area of 1,000-4,800 m²/g. In another embodiment, the porous activated asphaltene material has a BET specific surface area of about 4,000 m²/g, preferably about 4,500, more preferably about 4,470 m²/g. However, in one embodiment, the porous activated asphaltene material has a BET specific surface area of less than 200 m²/g or greater than 4,800 m²/g. For instance, the porous activated asphaltene material may have a BET specific surface area of 0.5-10 m²/g, 10-50 m²/g, 50-100 m²/g, 100-150 m²/g, or 150-200 m²/g. In one embodiment, the BET specific surface area of the porous activated asphaltene material may be increased by carrying out a process step for a longer time. For instance, grinding the compound for 20 minutes may lead to a greater BET specific surface area of the porous activated asphaltene material than grinding the compound for only 3 minutes.

Figure 2:
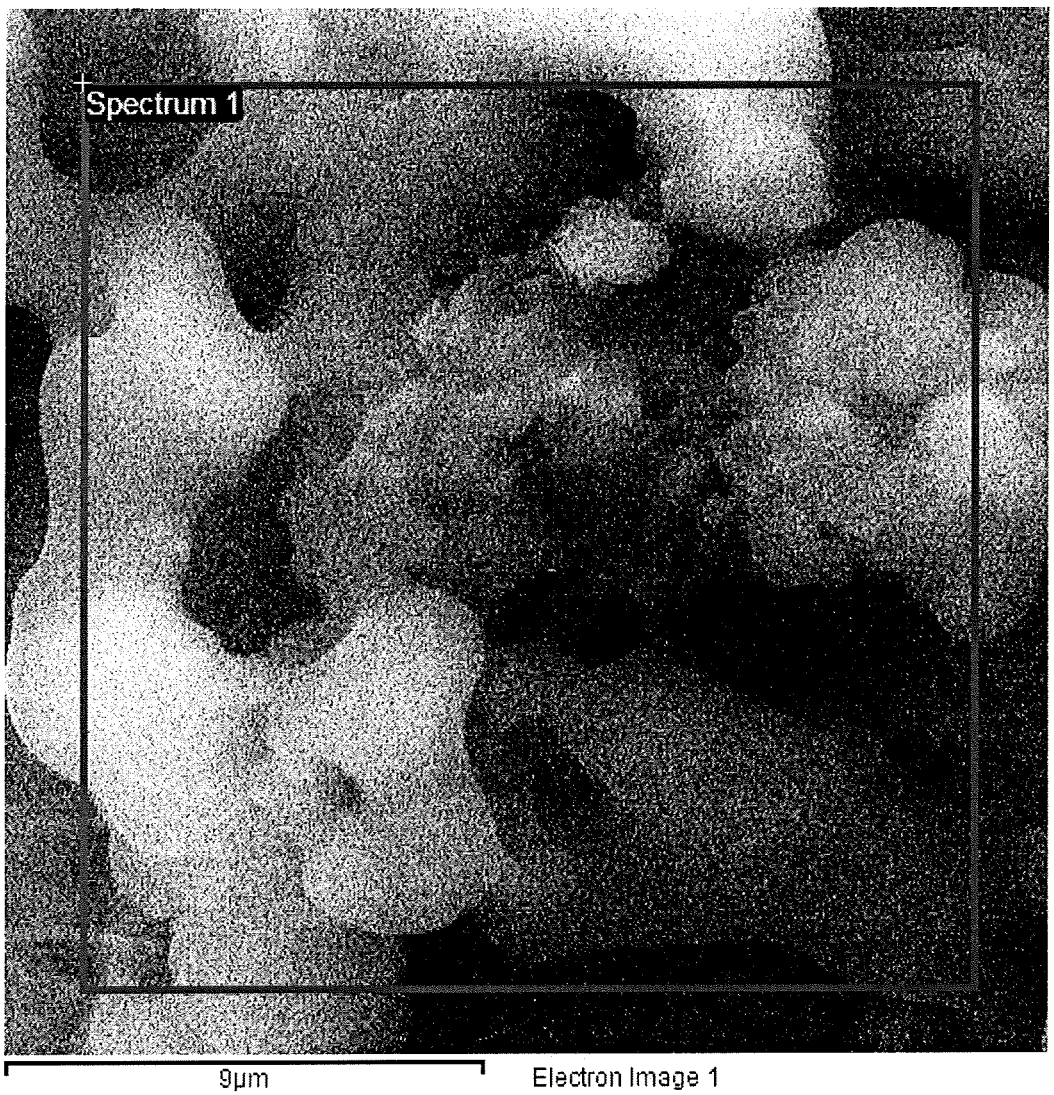
FIG. 2 is a scanning electron microscopy (SEM) image of the porous activated asphaltene material, as aggregated particles, with a scale bar of 9 μm.
Figure 3:
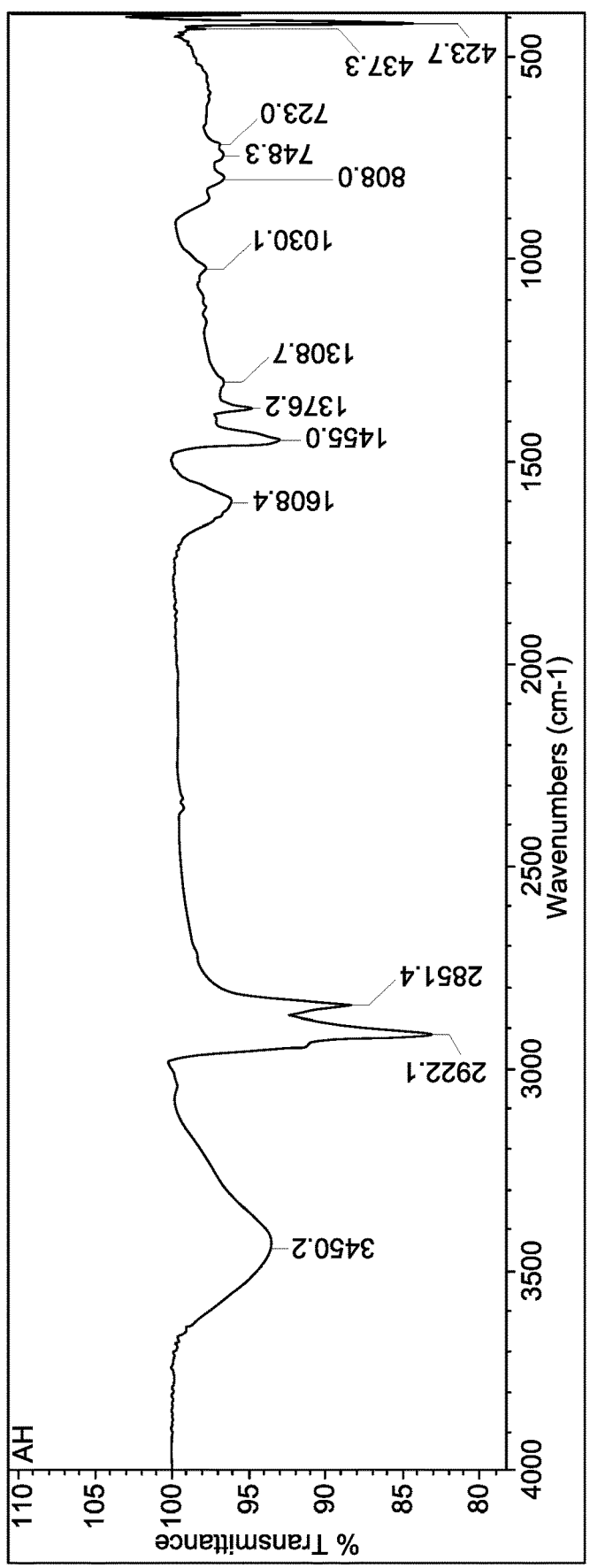
FIG. 3 is an infrared spectrum of an unmodified asphaltene material.
Figure 4:
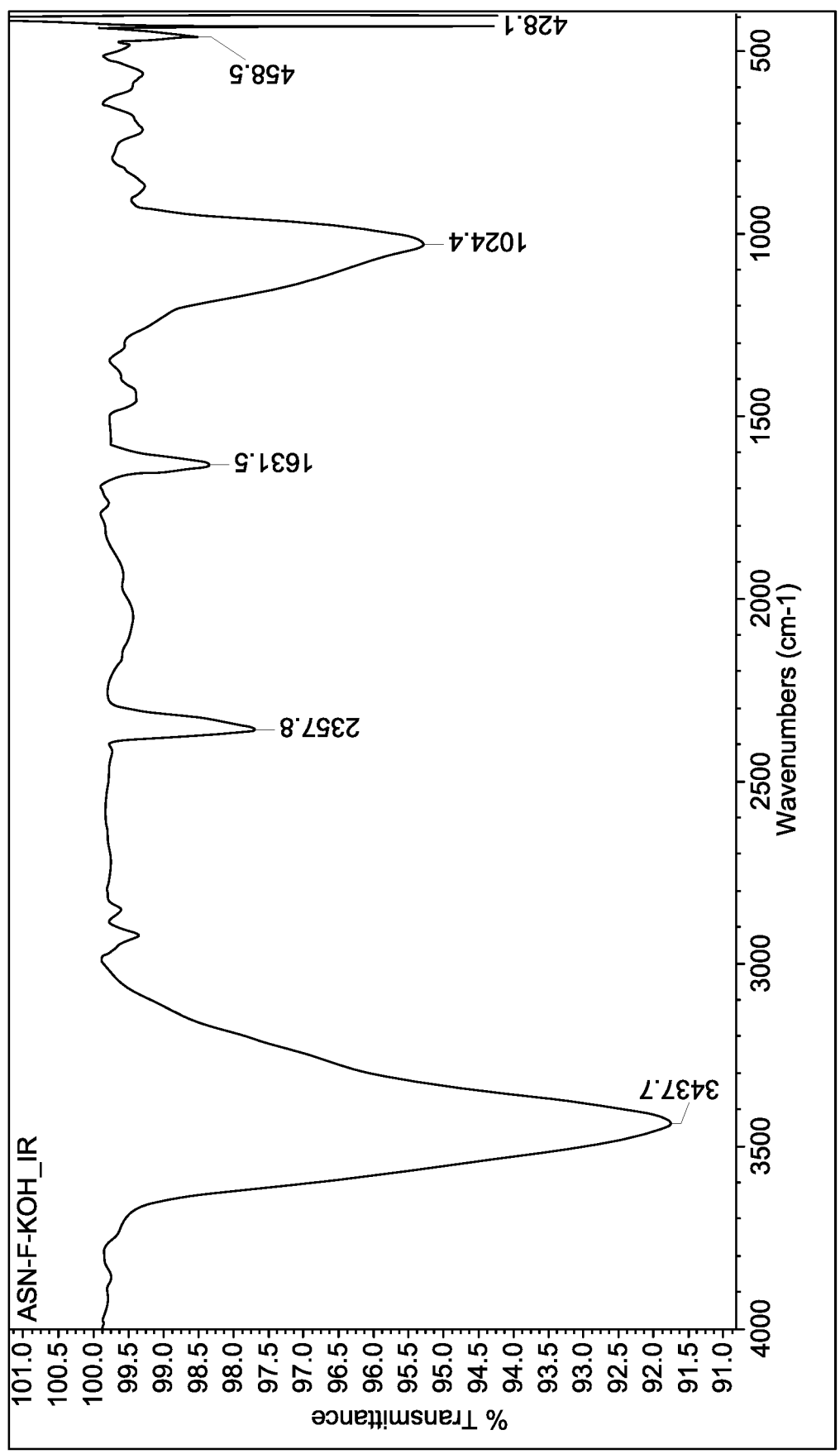
FIG. 4 is an infrared spectrum of the porous activated asphaltene material.

In one embodiment, the porous activated asphaltene material has an average pore size of 1-10 nm, preferably 2-8 nm, more preferably 3-7 nm, even more preferably 3.5-6.5 nm, though in other embodiments, the porous activated asphaltene material may have an average pore size of smaller than 1 nm or greater than 10 nm. In one embodiment, the porous activated asphaltene material may exhibit a hierarchical porosity or hierarchical pore structure. This means that the porous activated asphaltene material has a multi-modal pore size distribution, where the interior of a pore with a large pore size connects with pores having smaller pore sizes. For instance, FIG. 2 shows a hierarchical porosity, where pores having diameters of 3-5 μm expose smaller pores, having diameters of 5-50 nm.

In one embodiment, the porous activated asphaltene material has a pore volume of 0.1-0.7 cm³/g, preferably 0.2-0.6 cm³/g, more preferably 0.3-0.5 cm³/g. However, in other embodiments, the porous activated asphaltene material may have a pore volume of less than 0.1 cm³/g or greater than 0.7 cm³/g. In one embodiment, the porous activated asphaltene material has a porosity or void fraction of 10-85%, preferably 24-72%, more preferably 36-60%. However, in some embodiments, the porous activated asphaltene material may have a porosity or void volume of less than 10% or greater than 85%.

According to a second aspect, the present disclosure relates to a method for producing the porous activated asphaltene material of the first aspect. This method involves the steps of refluxing a solid asphaltene in nitric acid to produce a refluxed mixture; washing and drying the refluxed mixture to produce a functionalized asphaltene solid; grinding the functionalized asphaltene solid with a metal hydroxide to produce a ground mixture; heating the ground mixture to produce an activated powder; and then washing and drying the activated powder to produce the porous activated asphaltene material.

The water used to make solutions or to wash solid compounds may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water, and at 25° C. has a conductivity of less than 10 μS·cm⁻¹, preferably less than 1 μS·cm⁻¹; a resistivity of greater than 0.1 MΩ·cm, preferably greater than 1 MΩ·cm, more preferably greater than 10 MΩ·cm; a total solid concentration of less than 5 mg/kg, preferably less than 1 mg/kg; and a total organic carbon concentration of less than 1000 μg/L, preferably less than 200 μg/L, more preferably less than 50 μg/L.

In one embodiment, the solid asphaltene is refluxed in nitric acid for 1-8 hours, preferably 3-7 hours, more preferably 5-6.5 hours, or about 6 hours. However, in some embodiments, the solid asphaltene may be refluxed for less than 1 hour or greater than 8 hours. The refluxing may be at a temperature of 70-110° C., preferably 75-105° C., more preferably 78-90° C. The mass ratio of the asphaltene to the nitric acid may be 1:1-1:1,000, preferably 1:5-1:100, more preferably 1:10-1:50, even more preferably 1:20-1:40, though in some embodiments, asphaltene may be present at a higher mass than the nitric acid, or the nitric acid may be present at a mass greater than 1,000 times the mass of the solid asphaltene.

In one embodiment, the solid asphaltene may be dispersed in the nitric acid before the refluxing, for example by stirring, blending, shaking, sonication, or some other form of agitation. Preferably the solid asphaltene is dispersed by sonication, for example, sonication at ultrasonic frequencies of >20 kHz for 0.25-2 h, preferably 0.5-1.75 h, more preferably 1-1.5 h.

Preferably, the nitric acid is dissolved in water, for example, distilled or deionized water. The nitric acid may be dissolved in the water with a weight percentage of 50-95 wt %, preferably 60-85 wt %, more preferably 65-80 wt % relative to a combined mass of the nitric acid and water. In alternative embodiments, the solid asphaltene may be refluxed in other acids, such as acetic acid, hydrochloric acid, sulfuric acid, or some other acid. In another embodiment, other nitrating agents may be used, such as tetrafluoroborate, nitrito onium salts, dimethylnitrosulfonium ion, nitryl chloride, chloropicrin, tetranitromethan, or some other nitrating agent. Preferably, the solid asphaltene and nitric acid are agitated during the refluxing, for example, at a stirring rate of 100-500 rpm, preferably 150-400 rpm, more preferably 160-300 rpm by an impeller or a magnetic stir bar.

Refluxing the solid asphaltene in nitric acid produces a refluxed mixture that comprises the functionalized asphaltene solid. The functionalized asphaltene solid may be removed by filtration, decanting, centrifugation, or by drying the liquid phase of the mixture. The functionalized asphaltene solid may be washed with water, and in some embodiments, the functionalized asphaltene solid may be washed with an organic solvent, such as methanol, ethanol, or isopropanol. The functionalized asphaltene solid may then be dried in an oven, in a desiccator, in a vacuum desiccator, under a stream of inert gas, or by leaving at room temperature. Preferably the functionalized asphaltene solid is dried in an oven at a temperature of 50-200° C., preferably 80-150° C., more preferably 90-120° C., for 6-48 hours, preferably 12-36 hours, more preferably 18-30 hours, or about 24 hours.

In one embodiment, a mass ratio of the functionalized asphaltene solid to the metal hydroxide is 1:1-1:8, preferably 1:1.5-1:6, more preferably 1:3-1:5, even more preferably, about 1:4. However, in some embodiments, the functionalized asphaltene solid may be present at a greater mass than the metal hydroxide, or the metal hydroxide may be present at more than 8 times the mass of the functionalized asphaltene solid.

In one embodiment, the metal hydroxide is at least one selected from the group consisting of LiOH, NaOK, KOH, RbOH, CsOH, Be(OH)₂, Mg(OH)₂, Ca(OH)₂, Sr(OH)₂, and Ba(OH)₂, though in other embodiments, other metal hydroxides may be used. In a preferred embodiment, the metal hydroxide is KOH.

Following the washing and drying, the functionalized asphaltene solid may be ground or pulverized with the metal hydroxide to produce a ground mixture. In another embodiment, the functionalized asphaltene solid and the metal hydroxide may be ground or pulverized separately, and then mixed. Alternatively, the functionalized asphaltene solid, the metal hydroxide, or both may not be ground or pulverized. Preferably the grinding or pulverizing produces particles having diameters of 0.1-1,000 µm, preferably 0.5-500 µm, more preferably 1-200 µm, even more preferably 5-150 µm.

In one embodiment, the functionalized asphaltene solid and/or the metal hydroxide may be ground by a mortar and pestle or a blade grinder. In one embodiment, the functionalized asphaltene solid and/or the metal hydroxide may be ground by ball milling, or high energy ball milling. The functionalized asphaltene solid and/or the metal hydroxide may be milled with a miller, such as a planetary miller, an attrition mill, a vibratory mill or a high energy miller. Non-limiting examples of milling media (i.e. bowl and balls) include zirconium dioxide, tungsten carbide, silicon nitride, and alumina. In one embodiment, silicon nitride milling media is employed to minimize contamination of the ground mixture. The balls used for milling may have a diameter of 200-1,000 µm, preferably 300-900 µm, more preferably 400-800 µm, even more preferably 600-650 µm, though balls with diameters smaller than 200 µm or greater than 1,000 µm may be used. In one embodiment, a weight ratio of the balls to the ground mixture ranges from 4:1 to 35:1, preferably from 5:1 to 30:1, more preferably from 10:1 to 25:1. A process control agent, such as stearic acid or ethanol, may be added to the ground mixture to ensure the ground mixture does not cake. An amount of the process control agent may range from more than 0 wt % to 2 wt %, preferably 0.5-1.5 wt %, more preferably 0.5-1 wt % of the weight of the ground mixture. In a preferred embodiment, no process control agent is employed. In one embodiment, the milling is performed in an inert atmosphere, preferably provided by argon gas, though in another embodiment, the milling may be performed in air. The ground mixture may be milled for up to 10 hours, or up to 5 hours, or up to 2 hours, preferably for 10-90 minutes, preferably for 45-75 minutes. A high-energy ball milling apparatus may use a rotation rate of 2,000-10,000 rpm, preferably 2,500-5,000 rpm, more preferably 2,750-3,250 rpm. Preferably, the ball milling decreases the size of the particles by 30-95%, preferably 40-90%, more preferably 60-90% relative to a size of the particles (i.e. particles of functionalized asphaltene solid and/or metal hydroxide) before the ball milling.

The method also involves heating the ground mixture at 300-1000° C., preferably 500-900° C., more preferably 600-850° C., or about 800° C. for 10-60 minutes, preferably 20-50 minutes, more preferably 25-45 minutes, however, in some embodiments, the ground mixture may be heated at a temperature of less than 300° C. or greater than 1000° C., and/or the heating may be for less than 10 minutes or greater than 60 minutes. In one embodiment, during the heating, the ground mixture is maintained in an atmosphere consisting essentially of $N_2$. As described herein, the "atmosphere consisting essentially of $N_2$" means that the atmosphere comprises at least 97 vol % $N_2$, preferably at least 99 vol % $N_2$, more preferably at least 99.5 vol % $N_2$. However, other inert gases may be used, such as argon. In an alternative embodiment, the ground mixture may be maintained in an atmosphere of air during the heating. In one embodiment, the ground mixture, while heating, may be subjected to a continuous or intermittent flow of an inert gas at a volumetric flow rate of 100-1,000 cm$^3$/s, preferably 200-800 cm$^3$/s, more preferably 300-600 cm$^3$/s, at a pressure of 0.5-1.5 atm, preferably 0.7-1.2 atm, more preferably 0.8-1.1 atm. In one embodiment, a quartz tube furnace may be used to heat the ground mixture. In one embodiment, the ground mixture, while heating, may be located on a quartz boat placed in a quartz tube furnace. The heating produces the activated power, which may then be allowed to cool to room temperature.

Once cooled, the activated powder may be washed with water and an organic solvent such as methanol, ethanol, isopropanol, or acetone. Preferably, acetone is used for the washing. The activated powder may comprise unreacted metal hydroxide, which is preferably removed by the washing. To find out if the activated powder has been sufficiently washed, the pH of the filtrate may be checked to see if it reaches a neutral pH of about 7. The washed activated powder may then be dried to produce the porous activated asphaltene material. The drying may be done by any of the previously mentioned methods. Preferably, the drying is done by placing the activated powder in an oven at a temperature of 80-130° C., preferably 90-120° C., more preferably 100-110° C. The activated powder may be heated in the oven for 0.5-8 hours, preferably 1-6 hours, more preferably 1.5-3.0 hours.

In one embodiment, the porous activated asphaltene material and/or the functionalized asphaltene solid may comprise a weight percentage of N that is 1.5-6, preferably 2-5, more preferably 3-4 times greater than a weight percentage of N of the solid asphaltene. In another embodiment, the porous activated asphaltene material and/or the functionalized asphaltene solid may comprise a weight percentage of O that is 2-20, preferably 5-15, more preferably 8-12 times greater than a weight percentage of O of the solid asphaltene. Preferably these changes in weight percentage of N or O are due to the refluxing of the solid asphaltene with the nitric acid to produce the functionalized asphaltene solid and/or the heating of the ground mixture (of the functionalized asphaltene solid and metal hydroxide) to produce the porous activated asphaltene material. The asphaltene-based products may be characterized by FT-IR, EDX, DSC, TGA, NMR or other techniques at any point in the method, in order to monitor the effects of functionalization and activation.

According to a third aspect, the present disclosure relates to a method of reducing a contaminant concentration in an aqueous solution. This method involves the step of mixing the porous activated asphaltene material of the first aspect with the aqueous solution comprising the contaminant. The porous activated asphaltene material reduces the contaminant concentration in the aqueous solution by adsorption.

The aqueous solution may be a solution from an ocean, a bay, a river, a lake, a swamp, a pond, a pool, a rain sample, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaner, or some other place that may be a source of contaminated water mixtures. In another embodiment, the aqueous solution may be prepared in a laboratory or pilot plant for the purpose of testing contaminant removal. In some embodiments, the aqueous solution may be a brine, or comprise sea water or salt water.

In one embodiment, the aqueous solution may comprise a non-polar liquid phase at a volume percent concentration of 0.5-50%, preferably 2-40%, more preferably 4-30% relative to a total volume of the aqueous solution. The non-polar liquid phase may be emulsified or dispersed throughout the aqueous solution, may float at the top of the aqueous solution, or some combination of both. In another embodiment, the aqueous solution may not contain a non-polar liquid phase.

The contaminant may be present in the aqueous solution at a concentration of 5 mg/L-2 g/L, preferably 10 mg/L-1 g/L, more preferably 20 mg/L-500 mg/L, even more preferably 25 mg/L-150 mg/L, or about 50 mg/L. However, in some embodiments, the contaminant may be present in the aqueous solution at a concentration of less than 5 mg/L or greater than 2 g/L.

In one embodiment, the contaminant is at least one selected from the group consisting of Pb, Cr, Cd, Se, Hg, As, Mn, Ni, Cu, Zn, Ag, Tl, and Sb. In a further embodiment, the contaminant may be Pb, Cr, As, Hg, and/or Se. In a preferred embodiment, the contaminant may be Cr, Pb, or both. Preferably where the contaminant is a metal, the contaminant has an oxidation state of +2. However, in other embodiments, the metal may have an oxidation state of 0, +1, +3, or +4.

In one embodiment, the contaminant is a dye. The dye may be an azin dye, an azo dye, a diarylmethane dye, a fluorescent dye, a food coloring, a fuel dye, an ikat dye, an indigo structured dye, an indophenol dye, a perylene dye, a phenol dye, a quinoline dye, a rhodamine dye, a solvent dye, a staining dye, a thiazine dye, a thiazole dye, a triarylmethane dye, a vat dye, a violanthrone dye, or some other type of dye. In another embodiment, the contaminant may be some other organic compound, such as a pharmaceutical compound, a metabolite, a microbial toxin, an herbicide, a pesticide, or a steroid.

In one embodiment, the porous activated asphaltene material may be contacted with the aqueous solution by dispersing or mixing the porous activated asphaltene material in a fixed volume of aqueous solution, and then stirring or agitating the aqueous solution to keep the porous activated asphaltene material evenly mixed throughout. In one embodiment, the porous activated asphaltene material is dispersed or mixed within the aqueous solution at a concentration of 0.5-15 g/L, preferably 1-12 g/L, more preferably 5-10 g/L, even more preferably 6-9 g/L, or about 8 g/L. However, in some embodiments, the porous activated asphaltene material may be dispersed within the aqueous solution at a concentration of less than 0.5 g/L or greater than 15 g/L.

In one embodiment, the porous activated asphaltene material may not be dispersed or mixed in the aqueous solution but fixed to a solid support, such as a plate or a wire mesh. In one embodiment, the solid support may be planar. The solid support may also be a single piece so that the porous activated asphaltene material may be easily removed from the aqueous solution, or removed from a vessel. In a further embodiment, where the porous activated asphaltene material is attached to a solid support so that it does not disperse, the aqueous solution may be continually flowed over the porous activated asphaltene material. In another related embodiment, the aqueous solution may be intermittently flowed over the porous activated asphaltene material. Alternatively, the porous activated asphaltene material may be dispersed but confined within a volume of wire mesh. In another embodiment, the porous activated asphaltene material may be fixed to a solid support, but dispersed or mixed in the aqueous solution. For example, the porous activated asphaltene material may be attached to magnetic microparticles having diameters of 10-400 μm, preferably 40-200 μm.

In one embodiment, at least 70 wt %, preferably at least 75 wt %, more preferably at least 80 wt % of the contaminant, relative to an initial total weight of the contaminant, is adsorbed by the porous activated asphaltene material in at least 120 minutes. In other embodiments, at least 70 wt %, preferably at least 75 wt %, more preferably at least 80 wt % of the contaminant, relative to the initial total weight of the contaminant, is adsorbed in 20-110 minutes, preferably 30-100 minutes, more preferably 70-90 minutes. In one embodiment, at least 90 wt %, preferably at least 92 wt %, more preferably at least 95 wt % of the contaminant, relative to the initial total weight of the contaminant, is adsorbed by the porous activated asphaltene material in at least 250 minutes. In other embodiments, at least 90 wt %, preferably at least 92 wt %, more preferably at least 95 wt % of the contaminant, relative to the initial total weight of the contaminant, is adsorbed in 110-400 minutes, preferably 120-220 minutes, more preferably 150-200 minutes.

In one embodiment, the aqueous solution has a pH of 2.5-8.0, preferably 3.5-7.0, more preferably 4.0-6.0, or about 4.5. The pH may be adjusted using the addition of buffer, such as acetate buffer, or acids, such as HCl, by a person having ordinary skill in the art. In some embodiments, however, the aqueous solution may have a pH of lower than 2.5 or greater than 8.0. In one embodiment, the porous activated asphaltene material may adsorb more of a certain contaminant at a specific pH range.

In one embodiment, the aqueous solution has a temperature of 20-55° C., preferably 25-50° C., more preferably 30-45° C., even more preferably 32-40° C. In one embodiment, the adsorption of the contaminant is an endothermic process, and thus more of the contaminant is adsorbed at higher temperatures. In an alternative embodiment, the contaminant adsorption may be an exothermic process, which may be more efficient at lower temperatures. In another embodiment, the contaminant adsorption may not be sufficiently influenced by the aqueous solution temperature.

In one embodiment, the porous activated asphaltene material has an adsorption capacity of 15-950 mg, preferably 100-900 mg, more preferably 250-850 mg of the contaminant per g of the porous activated asphaltene material. In another embodiment, preferably the porous activated asphaltene material has an adsorption capacity of preferably 17-70 mg, more preferably 20-50 mg of the contaminant per g of the porous activated asphaltene material. However, in some embodiments, the porous activated asphaltene material may have an adsorption capacity of less than 15 mg per g, or greater than 950 mg per g. In one embodiment, the adsorption capacity may depend on the identity of the contaminant. For example, and without limitation, Cr may have a higher adsorption capacity than Pb.

The adsorption capacity $q_{contaminant}$ (mg/g) may be calculated using Eq. (2):

$$q_{contaminant} = \frac{(C_i - C_e)V}{W} \qquad \text{Eq. (2)}$$

where $C_i$ and $C_e$ are the initial and equilibrium concentrations of the contaminant, respectively, in mg/L; W is the weight of the porous activated asphaltene material in g; and V is the volume of the solution in L. The equilibrium concentration, $C_e$, of the contaminant is the concentration of unadsorbed contaminant that stays relatively constant. This equilibrium concentration may be reached with least 1,400 minutes of mixing, preferably with at least 600 minutes of mixing, more preferably with at least 300 minutes of mixing, though in some embodiments, equilibrium concentrations may be reached within a shorter time period of mixing. Preferably, a porous activated asphaltene material that has a higher surface area than a second porous activated asphaltene material has a greater adsorption capacity, due to more exposed surfaces for contaminant to adsorb.

Without being bound by any particular hypothesis, the heavy metal ions and other contaminants may interact with the porous activated asphaltenes through π-π electron interactions. This interaction generally takes place between the π electron system of the porous activated asphaltenes and heavy metal ions [Cabeza, A. et al. *Inorg Chem* 41 (2002) 2325-2333—incorporated herein by reference in its entirety]. Functional groups (or active groups) on the asphaltenes, including but not limited to —COOH, —OH, and —NH2, may also be responsible for hydrogen bonding to the heavy metal ions [Temkin, M. J. et al. *Acta Physiochim URSS* 12 (1940) 217-222—incorporated herein by reference in its entirety]. Because the porous activated asphaltenes have charged surfaces, electrostatic interactions may also contribute to adsorption [Coşkun, R. et al. *React Funct Polym* 66 (2006) 599-608—incorporated herein by reference in its entirety]. In some embodiments, other electrostatic interactions may be responsible for adsorbing contaminants to the asphaltene.

In one embodiment, the adsorption of the contaminant by the porous activated asphaltene material fits well with at least one of Langmuir, Freundlich, and Temkin isotherm models, thereby inferring that the adsorption occurs as a monolayer and as a heterogeneous surface adsorption.

In a further embodiment, the method includes the steps of removing the porous activated asphaltene material from the aqueous solution to produce a recovered asphaltene material; mixing the recovered asphaltene material with an acidic solution; drying the acidic solution to produce a cleaned asphaltene material; and reusing the cleaned asphaltene material. The cleaned asphaltene material maintains an adsorption capacity for at least 5 purification cycles.

Preferably in removing the porous activated asphaltene material, all of it may be recovered after each purification cycle, enabling multiple cycles to be repeated with a single batch of porous activated asphaltene material. However, in some embodiments, 0.1-1 mass %, or 1-5 mass %, may be lost with each cycle. Preferably the reuse of the porous activated asphaltene material does not significantly change its morphology or other physical characteristics. The porous activated asphaltene material may be removed from the aqueous solution by any means similar to those mentioned for removing the functionalized asphaltene solid from the nitric acid solution. In addition, where the recovered asphaltene is attached to a magnetic support, a magnet may be used In one embodiment, the recovered asphaltene material may be mixed with the acidic solution at a concentration of 1-30 g/L, preferably 5-25 g/L, more preferably 10-20 g/L, though in some embodiments, the concentration may be less than 1 g/L or greater than 30 g/L. The mixing may involve techniques of agitating or dispersing, as previously mentioned, and in some embodiments, the acidic solution may be cooled or heated. Alternatively, the recovered asphaltene material and acidic solution may first be mixed, and then left to sit without agitation.

In a further embodiment, the acidic solution comprises one or more inorganic acids at a total concentration of 0.05-0.5 M, preferably 0.07-0.4 M, more preferably 0.1-0.3 M. However, in some embodiments, the acidic solution may comprise organic acids, such as acetic acid, or may comprise one or more inorganic acids at a total concentration of less than 0.05 M or greater than 0.5 M. In one embodiment, the inorganic acid may be nitric acid, hydrochloric acid, hydrofluoric acid, sulfuric acid, phosphoric acid, hydrobromic acid, boric acid, perchloric acid, hydroiodic acid, or some other inorganic acid or mineral acid. Preferably the inorganic acid is sulfuric acid, hydrochloric acid, or a mixture of both. Where two inorganic acids are used, the inorganic acids may be present in the acidic solution at a mol ratio of 1:10-10:1, preferably 1:5-5:1, more preferably 1:2-2:1.

In one embodiment, mixing the recovered asphaltene material with the acidic solution enables desorption of the contaminant from the recovered asphaltene material into the acidic solution. In one embodiment, 20-50 wt %, preferably 25-45 wt %, more preferably 27-40 wt % of the adsorbed contaminant, relative to the initial weight of the adsorbed contaminant, releases from the recovered asphaltene material and becomes free in the acidic solution after 10-40 minutes, more preferably after 15-35 minutes of mixing. In another embodiment, 60-100 wt %, preferably 65-95 wt %, more preferably 70-90 wt % of the adsorbed contaminant, relative to the initial weight of the adsorbed contaminant, releases from the recovered asphaltene material and becomes free in the acidic solution after 60-180 minutes, more preferably after 70-120 minutes of mixing. In some embodiments, depending on the type of contaminant, the acidic solution may react with the adsorbed contaminant. In one embodiment, the recovered asphaltene is in contact with the acidic solution for 30-60 min, 1-2 h, 2-6 h, or 12-24 h. In another embodiment, the recovered asphaltene may be stored indefinitely in the acidic solution until it is needed for reuse.

The recovered asphaltene is removed from the acidic solution to produce a cleaned asphaltene material. Preferably the recovered asphaltene is removed from the acidic solution in any means similar to those previously mentioned for removing the functionalized asphaltene solid from the nitric acid solution. In addition, where the recovered asphaltene is attached to a magnetic support, a magnet may be used. In another embodiment, a base may be added to the acidic solution to neutralize the solution before removing the asphaltene. Preferably the cleaned asphaltene material is rinsed, washed, and/or dried in a manner similar to that described for the functionalized asphaltene solid.

In an alternative embodiment, the porous activated asphaltene material may be fixed to a support and exposed to a flowing contaminant solution, where the porous activated asphaltene material then adsorbs a contaminant. The used porous activated asphaltene material may then be cleaned in place and optionally dried while staying fixed to the support. Alternatively, the nanostructured material may not be fixed to a support, but confined within a permeable membrane or filter, allowing similar operation Following the drying, the cleaned asphaltene material may be reused to adsorb the same or a different contaminant from an aqueous solution, as described in the third aspect of the disclosure. In one embodiment, the cleaned asphaltene material maintains its adsorption capacity for at least 5 purification cycles. Here, "maintains adsorption capacity" means that the ratio of the maximum adsorbed contaminant mass per mass of cleaned asphaltene material is at least 70%, preferably at least 80%, more preferably at least 90% of its initial value. A purification cycle refers to the adsorption of a contaminant by the cleaned asphaltene material and the subsequent cleaning of the asphaltene material to remove a portion or all of the contaminant. Preferably the cleaned asphaltene material is able to maintain its adsorption capacity across different contaminants. In other embodiments, the cleaned asphaltene material is able to maintain its adsorption capacity for at least 10 cycles, at least 20 cycles, at least 30 cycles, or even at least 50 cycles. In one embodiment, a recovered asphaltene material is able to maintain its adsorption capacity without cleaning, for instance, if the recovered asphaltene material had been previously mixed with low concentrations of a contaminant.

The examples below are intended to further illustrate protocols for preparing the porous activated asphaltene material, and are not intended to limit the claims.

EXAMPLE 1

Asphaltene Separation

About 7.0 g of Arabian heavy residue was transferred to a beaker and heated with a very small amount of n-heptane. The solution was mixed properly and transferred to a 2 L container, followed by the addition of 700 mL n-heptane. The solution was agitated in a mechanical shaker with a water bath. In order to increase the residue solubility in the n-heptane, the solution was heated at 90° C. for 2 h with continuous stirring. Then the solution was covered using aluminum foil and left standing to cool overnight. This gradual cooling allows efficient precipitation of asphaltenes. Afterwards, the solution was filtered with filter paper having a pore size of 0.8 μm. The residue part was extracted by soxlet using toluene as extracting solvent, and the extract was filtered with the same filter paper. After the evaporation of extract, the asphaltenes were collected in a beaker. Then the asphaltenes were washed many times with small amounts of n-heptane. Finally, the solid asphaltene was dried at 105° C. for 2 h.

The invention claimed is:

1. A porous activated asphaltene material, comprising:
   an asphaltene compound having an elemental composition of 55-77 wt % C, 10-40 wt % O, 1-3 wt % S, 0.6-1.7 wt % H, and 0.2-1.2 wt % N each relative to a total weight of the asphaltene compound,
   wherein the asphaltene compound has at least one active group selected from the group consisting of an amine group, a nitro group, a carbonyl group, a carboxylic group and a hydroxyl group, the at least one active group covalently bonded to an asphaltene core,
   wherein the porous activated asphaltene material has a hierarchical porosity with a multi-modal pore distribution including first pores having a pore diameter in a range of 5-50 nm and second pores having a pore diameter of 3-5 μm, wherein the interior of the second pores connects with the first pores; and
   wherein the porous activated asphaltene material has a BET specific surface area of 1,000-4,800 $m^2/g$.

2. The porous activated asphaltene material of claim 1, which has an average particle size of 1-20 μm.

3. The porous activated asphaltene material of claim 1, which has a particle size distribution of 0.5-100 μm, wherein at least 60% of the particles have a particle size of 1-20 μm.

4. The porous activated asphaltene material of claim 1, which has a pore volume of 0.1-0.7 $cm^3/g$.

5. A method of reducing a contaminant concentration in a solution, the method comprising:
   mixing the porous activated asphaltene material of claim 1 with the solution comprising the contaminant at a contaminant concentration of 5 mg/L-2 g/L, wherein a concentration of the porous activated asphaltene material in the solution after mixing is 0.5-15 g/L, and wherein the porous activated asphaltene material reduces the contaminant concentration in the solution by adsorption,
   wherein the contaminant is adsorbed to the porous activated asphaltene material through π-π electron interactions.

6. The method of claim 5, wherein the contaminant is at least one selected from the group consisting of Pb, Cr, Cd, Se, Hg, As, Mn, Ni, Cu, Zn, Ag, Tl, and Sb.

7. The method of claim 5, wherein the contaminant is a dye.

8. The method of claim 5, wherein the porous activated asphaltene material has an adsorption capacity of 15-950 mg of the contaminant per g of the porous activated asphaltene material.

9. The method of claim 5, wherein at least 70 wt % of the contaminant is adsorbed by the porous activated asphaltene material in at least 120 minutes.

10. The method of claim 5, wherein at least 90 wt % of the contaminant is adsorbed by the porous activated asphaltene material in at least 250 minutes.

11. The method of claim 5, wherein the aqueous solution has a pH of 2.5-8.0.

12. The porous activated asphaltene material of claim 1, having 30-40 mol % aromatic hydrocarbons, and 60-70 mol % aliphatic hydrocarbons, relative to a total number of hydrocarbons.

* * * * *